Figure 1:
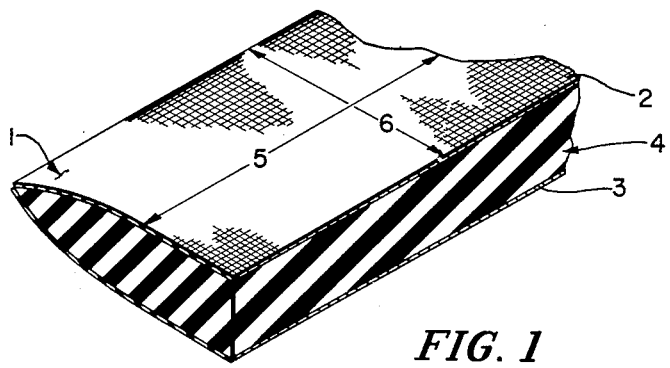

June 23, 1953   C. J. FORD   2,643,206
PACKAGE FOR SHIPPING AND STORING A CONDUCTIVE RUBBER
HEATING ELEMENT AND METHOD OF MAKING SAME
Filed Sept. 28, 1949

Inventor
CHARLES J. FORD

By

ATTORNEY

Patented June 23, 1953

2,643,206

UNITED STATES PATENT OFFICE 2,643,206

PACKAGE FOR SHIPPING AND STORING A CONDUCTIVE RUBBER HEATING ELEMENT AND METHOD OF MAKING SAME

Charles J. Ford, Akron, Ohio, assignor to Wingfoot Corporation, Akron, Ohio, a corporation of Delaware Application September 28, 1949, Serial No. 118,303

18 Claims. (Cl. 154—79)

This invention relates generally to a method of making a conductive rubber heating element and more specifically to electrically conductive rubber heating elements in which the conductivity has to be closely controlled. The present invention is applicable to any of several different forms of electrically conductive rubber heating elements but is especially well adapted to those to be used as airplane propeller de-icers.

A particular object of this invention is to provide a means of controlling the conductivity of electrically conductive rubber within very close tolerances.

Another object of this invention is to provide a new method of fabricating conductive rubber heating elements and at the same time provide a shipping and storage package for the elements.

Another object of this invention is to provide a conductive rubber heating element that can be handled without special precautions to prevent undue flex, causing a subsequent change in the conductivity of the rubber element.

A still further object of this invention is to provide a method to be used in the manufacture of conductive rubber airplane propeller de-icers by which the rigid specifications therefor can be met.

Other objects of the invention will appear hereinafter as the description proceeds, the novel features, arrangements and combinations being clearly pointed out in the specification and in the appended claims.

Figure 2:
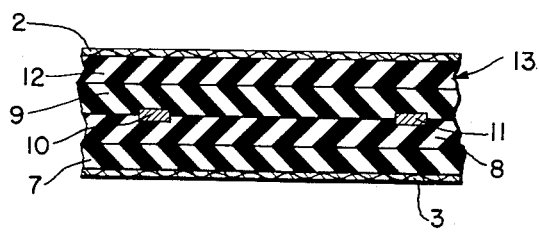

In the drawings:

Fig. 1 is a perspective view of a fragmentary section of a conductive rubber heating element embodying the invention, interior details being omitted; and Fig. 2 is a fragmentary cross section of a typical conductive rubber heating element embodying the invention and showing interior details.

One of the problems that confront the aircraft engineers is the prevention of ice accumulations on the various parts of airplane structures. Numerous types of de-icing means have been developed for accomplishing this and one of these means is the use of heating elements in which the heat is furnished by electrically energized conductive rubber heating elements such for example as shown, described and claimed in the Griffith et al. Patent 2,406,367 and the Hunter Patent 2,454,874. One of the major difficulties encountered in the use of conductive rubber for this purpose is the great change which frequently takes place in the conductive characteristics of the material between the time of its manufacture and its ultimate installation.

Part of this change in the conductive characteristics of the conductive rubber is caused by the susceptibility of the de-icer to dimensional variations because of shrinkage, relief of vulcanizing stresses, etc. Flexing and rough handling will also alter the conductive characteristics of the rubber element. The usual means of controlling the dimensional stability of molded rubber articles such as fabric inserts are not sufficient to meet the requirements where the permissible variation in conductivity is very small.

The present invention solves these problems by providing a satisfactory means of retaining the conductive rubber element in its vulcanized position and shape until the element is ready to be installed for ultimate use. To insure against the intolerable variations in the properties of the conductive rubber, it is vulcanized between or integumented with a dimensionally stable, yet flexible, material that adheres sufficiently to conductive rubber heating elements to prevent any shrinkage or distortion, but can be readily removed when the element is installed.

The conductive rubber heating element itself is made by any of the usual means that are well known in the art except that it is vulcanized so as to separably adhere to a layer or an integument of dimensionally stable, flexible material. The Bull et al. Patent 2,314,766, Cassidy et al. Patent 2,569,921 and Cowgill Patent 2,515,294 are illustrative of the construction of conductive rubber heating panels.

One such material which may be used to particular advantage is a fabric known in the industry as "holland" cloth (hereinafter called holland) which is a starch sized cotton cloth. The angle (normally 90°) between the warp and the weft cords in a conventional fabric material will change when the fabric is subjected to unopposed stresses and this change in angle is generally referred to as "pantographing." Holland is especially suitable for the purpose of the invention in that it is dimensionally stable and will not distort or pantograph when subjected to unopposed stresses and at the same time will not appreciably change in linear dimensions.

The holland is sufficiently rigid to resist the stresses and distortion caused by the shrinkage and relief of the vulcanization stresses in the conductive rubber element during and after fabrication. It thus serves to retain the element in its vulcanized shape until it is permanently installed in its final location. While holland is rigid in the sense described above, it is sufficiently flexible that it can be readily stripped from the conductive rubber element prior to final installation without causing undue distortion of the element and thereby prevents variation in the electrical conductivity of the rubber.

During the vulcanization of the conductive rubber element, the holland is adhered to the rubber element but does not become an integral part of the structure; thus it can later be removed prior to final installation of the element. The adhesion of the holland to the rubber element is sufficient, however, to prevent any separation therebetween caused by ordinary handling or by shrinkage and the relief of vulcanization stresses set up in the conductive rubber after vulcanization. Moreover, the holland will not deteriorate or lose the above-described characteristics when subjected to vulcanization temperatures. After the vulcanization is complete, the holland integument imparts sufficient rigidity to the structure to prevent any appreciable flexing of the conductive rubber element with ordinary handling, shipping or storage.

In Fig. 1, the article 1 produced by the practices of this invention is diagrammatically illustrated with the layers of holland 2 and 3 separably adhered to the conductive rubber heating element 4. The dimensions 5 and 6 of layers 2 and 3 remain substantially constant throughout the entire time the holland is in use. The layers 2 and 3 are removed from the element 4, preferably just prior to the final installation of the element 4 so that there can be no substantial change in the size or shape of the element 4 before it is firmly attached in its ultimate location, which thereafter retains it in its proper shape and size.

Referring to Fig. 2, the structure of a section of a typical conductive rubber heating element 13 is shown. In the fabrication of the element 13, a layer 7 of insulating or non-conductive rubber is formed first and the layers 8 and 9 of electrically conductive rubber are next applied. Electric energy is supplied to the electrically conductive rubber through the spaced, parallel conductor wires 10 and 11 which are disposed between layers 8 and 9 and firmly bonded thereto. Over this structure a layer 12 of non-conductive or insulating rubber is applied to complete the heating element 13. A layer of fabric (not shown) may be applied, if desired, to the layer 12 of non-conductive rubber and will become an integral part of the structure during vulcanization. The entire assembly 13 is interposed between layers 2 and 3 of holland and subjected to heat and pressure for vulcanization of the various rubber parts. The layers 2 and 3 become separably adhered to the upper and lower surfaces of the element 13 during vulcanization so as to become a unitary assembly. This assembly then remains in this condition until the element 13 is to be finally positioned. Preparatory to this positioning, the layers 2 and 3 are removed.

The structure of the electrically conductive rubber heating element is given as an example to illustrate the practice of the invention. It will be readily understood that the invention is not limited to the use of any particular structure. Moreover, there are many materials that may be used in place of the holland described above so long as they possess the same general physical properties described for holland. Some other satisfactory materials include metal foils, such as lead, aluminum and tin foil; treated papers, such as kraft or parchment paper; other treated fabrics, such as varnished cloth; and non-thermoplastic films, such as cellophane. Because of the nature of some of these materials, it may be necessary to use an adhesive or bonding agent between the material and the conductive rubber heating element to secure the necessary degree of adhesion but this may be done without in any way affecting the practice of the present invention.

While certain representative embodiments and details have been shown for the purpose of illustrating the invention, it will be apparent to those skilled in the art that various changes and modifications may be made therein without departing from the spirit or scope of the invention.

I claim:

1. A package for shipping and storing a conductive rubber heating element to maintain the electrical conductivity of the rubber substantially stable, said package including a substantially flat heating element of thin cross-section with top and bottom surfaces and having an electrically conducting rubber element with at least two metal conductors contained therein, and layers of dimensionally stable flexible material separably adhered to the top and bottom surfaces of said heating element.

2. A package for shipping and storing a conductive rubber heating element to maintain the electrical conductivity of the rubber substantially stable, said package including a substantially flat structure of thin cross-section with top and bottom surfaces, an electrically conducting rubber element included in said structure and having at least one pair of spaced metal conductors, and layers of dimensionally stable, flexible material separably adhered to the top and bottom surfaces of said structure.

3. An article of the type described in claim 2 in which the dimensionally stable flexible material is treated fabric.

4. An article of the type described in claim 3 in which the treated fabric is holland.

5. A package for shipping and storing a conductive rubber heating element to maintain the electrical conductivity of the rubber substantially stable, said package including a heating element of thin cross-section having an electrically conducting rubber element with at least two parallel metal conductors contained therein, and layers of dimensionally stable flexible material separably adhered to the opposed surfaces of said element.

6. A package for shipping and storing a conductive rubber heating element to maintain the electrical conductivity of the rubber substantially stable, said package including a structure of thin cross-section, said structure having a sheet of conductive rubber between and in contact with at least two leads of different polarity, and layers of dimensionally stable flexible material separably adhered to the opposed surfaces of said structure.

7. An electrically stabilized conductive rubber heating element of thin cross-section having a sheet of conductive rubber between and in contact with at least two leads of different polarity, and layers of dimensionally stable flexible material separably adhered to the opposed surfaces of said heating element, said material causing the heating element to be substantially rigid and electrically stable.

8. An article of the type described in claim 7 in which the flexible material is metal foil.

9. An article of the type described in claim 8 in which the metal foil is aluminum foil.

10. An article of the type described in claim 8 in which the metal foil is tin foil.

11. An article of the type described in claim 7 in which the flexible material is treated paper.

12. The method of packaging for handling a conductive rubber heating element with at least two spaced metal conductors of different polarity contained therein of thin cross-section comprising the steps of separably adhering layers of dimensionally stable flexible material to the opposed surfaces of said heating element to cause the heating element to be substantially rigid and electrically stable.

13. The method as defined in claim 12 in which the dimensionally stable flexible material is treated fabric.

14. The method as defined in claim 13 in which the treated fabric is holland.

15. The method as defined by claim 12 in which the dimensionally stable, flexible material is metal foil.

16. The method as defined by claim 12 in which the dimensionally stable, flexible material is treated paper.

17. The method of packaging for handling a conductive rubber heating element of thin cross-section comprising the steps of interposing the unvulcanized heating element having at least two spaced metal conductors contained therein between layers of dimensionally stable flexible material and subjecting said heating element and material to heat and pressure to vulcanize the heating element and separably adhere the material to said heating element to produce a substantially rigid and electrically stable heating element.

18. The method of preparing a conductive rubber heating element comprising the steps of providing a layer of dimensionally stable, flexible material, applying a layer of non-conductive rubber to said flexible layer, superposing a layer of conductive rubber on said layer of non-conductive rubber, attaching conductors and connections to said layer of conductive rubber, applying a second layer of conductive rubber over said conductors and connections, applying another layer of non-conductive rubber over said second conductive rubber layer, covering the last-mentioned layer of non-conductive rubber with a layer of dimensionally stable, flexible material, and subjecting the entire composite structure to heat and pressure to vulcanize the rubber and cause said dimensionally stable, flexible material to be separably adhered to the said layers of non-conductive rubber.

CHARLES J. FORD.

References Cited in the file of this patent

UNITED STATES PATENTS

| Number | Name | Date |
|---|---|---|
| 1,503,701 | Morton et al. | Aug. 5, 1924 |
| 2,341,360 | Bulgin | Feb. 8, 1944 |
| 2,430,630 | Davis | Nov. 11, 1947 |
| 2,464,273 | Tanchel | Mar. 15, 1949 |
| 2,496,279 | Ely et al. | Feb. 7, 1950 |
| 2,503,457 | Speir et al. | Apr. 11, 1950 |

FOREIGN PATENTS

| Number | Country | Date |
|---|---|---|
| 490,546 | Great Britain | Aug. 17, 1938 |